Figure 1:
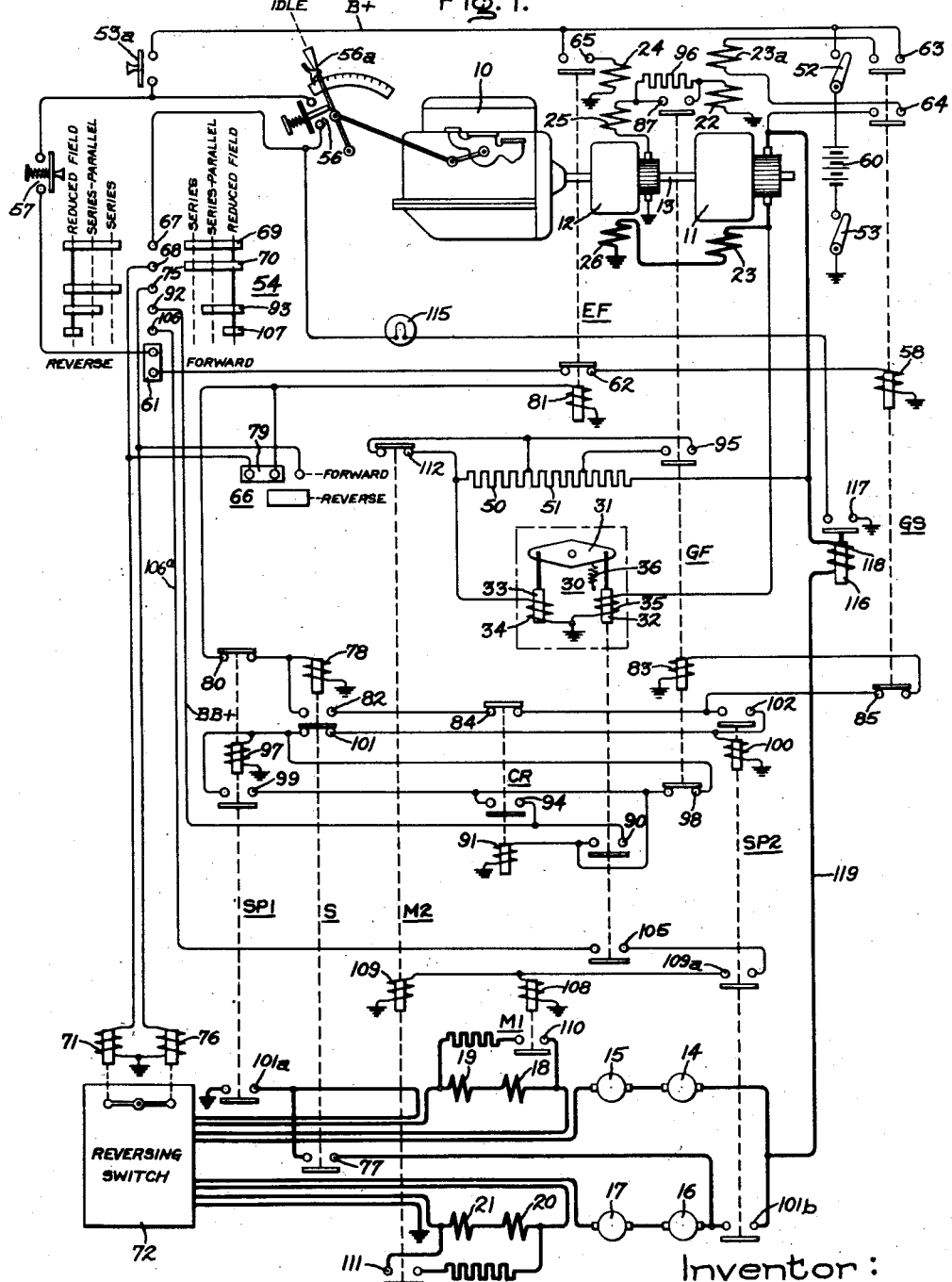

Dec. 2, 1941. J. W. McNAIRY 2,264,853
CONTROL SYSTEM
Filed Aug. 23, 1940 2 Sheets-Sheet 1

Inventor:
Jacob W. McNairy,
by Harry E. Dunham
His Attorney.

Dec. 2, 1941.   J. W. McNAIRY   2,264,853
CONTROL SYSTEM
Filed Aug. 23, 1940   2 Sheets-Sheet 2
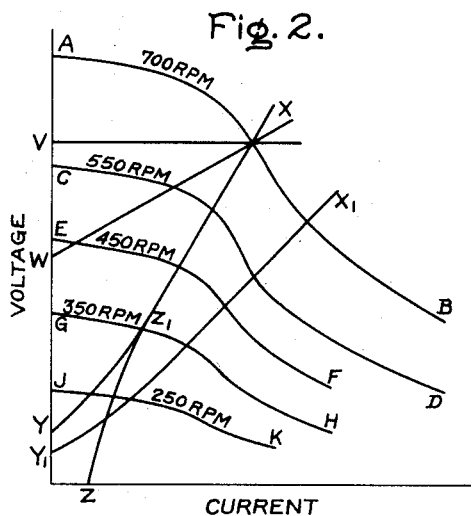
Fig. 2.
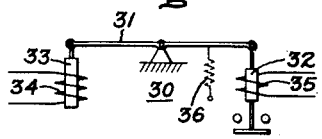
Fig. 3.
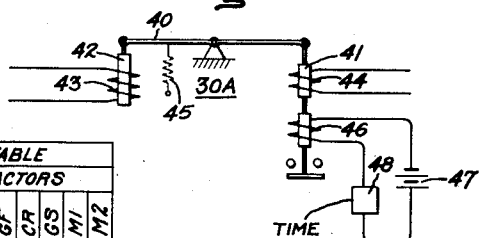
Fig. 4.
Fig. 5.
| CONTACTOR SEQUENCE TABLE | | | | | | | | | |
|---|---|---|---|---|---|---|---|---|---|
| STEPS | CONTACTORS | | | | | | | | |
|  | S | SP1 | SP2 | EF | GF | CR | GS | M1 | M2 |
| STARTING |  |  |  |  |  |  | ● |  |  |
| IDLING |  |  |  |  |  |  |  |  |  |
| SERIES | ● |  |  | ● | ● |  |  |  |  |
| T1 | ● |  |  | ● | ● | ● |  |  |  |
| T2 | ● |  |  |  | ● | ● |  |  |  |
| T3 | ● | ● |  |  | ● | ● |  |  |  |
| T4 |  |  | ● |  | ● | ● |  |  |  |
| T5 |  | ● | ● |  | ● | ● |  |  |  |
| SER.-PAR. |  | ● | ● | ● | ● |  |  |  |  |
| REDUCED FIELD |  | ● | ● | ● | ● |  |  | ● | ● |
Inventor:
Jacob W. McNairy,
by Harry E. Dunham
His Attorney.

Patented Dec. 2, 1941

2,264,853

UNITED STATES PATENT OFFICE 2,264,853

CONTROL SYSTEM

Jacob W. McNairy, Erie, Pa., assignor to General Electric Company, a corporation of New York Application August 23, 1940, Serial No. 353,883

18 Claims. (Cl. 172—179)

My invention relates to control systems, and more particularly to control systems for self-propelled electric vehicles and the like wherein the driving motors are connected to be energized from a variable voltage electric generator driven by a prime mover such as an internal combustion engine or the like.

In such drives, ordinarily there is no speed regulating or starting resistance for the motors, as the operating speed of the motor is controlled by variation in the voltage of the generator and by connecting the motors in different operating relations, as for example in series and in parallel or series-parallel. It is known to use a transfer relay for changing the motor connections from series to parallel or series-parallel. Such a transfer relay is shown in Patent No. 1,871,472 to R. T. Sawyer. The transfer relay of the Sawyer patent is responsive solely to generator voltage. With such voltage-responsive apparatus difficulty has been experienced at reduced engine speeds corresponding to partial throttle due to the fact that the generator voltage never attains sufficient value to effect the transfer from series to parallel. Under these conditions the vehicle can be run at only very low speeds. Furthermore, it has been found impracticable to make use of a voltage-responsive transfer relay which will effect transfer at low engine speeds, for such a relay is found to effect transfer far too early in the starting sequence when the engine is running at higher speeds.

Accordingly, it is an object of my invention to provide a series-parallel starting system for a self-propelled electric vehicle having means for transferring connections from series to parallel at the proper point in the starting sequence regardless of whether the engine is running at high speed or at low speed.

A further object of my invention is to provide in a drive of the above character, a single automatic means for controlling both the operating relationship of the various motors and the field shunting circuits for the motors.

With the foregoing objects in view I carry out my invention in one form by providing a differential transfer relay having impedance operating characteristics and connected to be energized from the main engine driven generator. My invention itself, however, will be better understood from the following description taken in connection with the accompanying drawings in which Fig. 1 is a schematic diagram of connections of the driving and auxiliary apparatus in a control system embodying my invention; Fig. 2 is a graphical illustration of the voltage characteristics of a generator suitable for use in connection with my invention; Fig. 3 is a diagrammatic illustration of a relay embodying my invention; Fig. 4 is a diagrammatic illustration of a relay embodying my invention in modified form; and Fig. 5 is a sequence table of contactor operation for the connections shown in Fig. 1. Like reference numerals have been applied to like parts throughout the drawings.

Referring now to the drawings, and particularly to Fig. 1 which represents a driving arrangement for a self-propelled vehicle the numeral 10 identifies a prime mover of the internal combustion type as, for example, a Diesel engine. The engine 10 is arranged to drive a main generator 11 and an exciter 12 mounted upon a common shaft 13. A plurality of driving motors 14, 15, 16 and 17 are coupled to the wheels of the vehicle and arranged to be energized from the generator 11. The driving motors 14, 15, 16 and 17 are provided with series fields 18, 19, 20 and 21 respectively. The driving motors 14 and 15 and their respective fields 18 and 19 are permanently connected in series, while the driving motors 16 and 17 and their respective series fields 20 and 21 are likewise permanently connected in series. The motors 16 and 17 may be connected either in series or in parallel with the motors 14 and 15. It will be understood, of course, that I do not wish to be limited to the precise number and arrangement of driving motors shown in the drawings, but that any desired number and combination of motors may be used so long as provision is made for changing connections of some of the motors from series to parallel. The main generator 11 is provided with a separately excited shunt field 22 energized by the exciter 12, a series connected commutating field 23 and a starting field 23a. The exciter 12 is provided with a separately excited shunt field 24, a series connected commutating field 25, and a differential field 26 connected in series with the main generator 11. Such a power system is described and claimed in Patent No. 1,969,495 to J. C. Barry.

From the disclosure of the patent to Barry it will be apparent that a generator, provided with an exciter having a differential series field as described, will possess, at a predetermined constant engine speed, a characteristic such as represented by the curve AB of Fig. 2. The curve AB of Fig. 2 is similar to the curve CD shown in Fig. 3 of the patent to Barry. The prime mover 10 is preferably of the type which operates at constant speed for any selected throttle setting. Under such conditions the portion XB of the curve AB of Fig. 2 will closely approximate the shape of an equilateral hyperbola. It will therefore be apparent that along this portion of the curve the power, as represented by the product of volts times amperes, is a constant. The curves CD, EF, GH, and JK of Fig. 2 represent constant horsepower curves for lower engine speeds. I wish it to be understood, however, that I do not desire to be limited to a system including a prime mover having constant speed control, since it will be apparent to those skilled in the art that my invention is equally applicable to a system including a prime mover having fuel control.

The curves VX, WX, YX and ZX of Fig. 2 represent various transfer relay characteristics superimposed upon the constant horsepower curves. The curve VX represents the characteristic of a relay such as that shown at 32 in Patent No. 1,871,472 to Sawyer. Such a relay characteristic may be mathematically represented by the equation V=constant. The curve WX represents the characteristic of a relay similar to that of the Sawyer patent but in which the operating point of the relay is slightly influenced by a boosting and bucking coil energized by the motor current. The characteristic of such a relay may be represented by the equation E—I= constant. The curves YX and ZX of Fig. 2 represent the transfer characteristics of relays according to my invention. The curve $Y_1X_1$ represents the drop out characteristics of a relay having the pick up characteristic represented by the curve YX. The meaning of the curves YX, ZX and $Y_1X_1$ will be more fully explained hereinafter.

In the normal accelerating sequence of a series-parallel system of the type to which my invention may be applied the master controller is first placed in its "reduced field" position and the engine throttle is then gradually opened to permit the control to carry out its operation automatically. At the beginning of the accelerating cycle the driving motors are connected in series and are operating in the neighborhood of the portion K of the curve JK. As the motors accelerate along the various curves from K toward A they arrive at a point X on the curve AB, for example, at which the motor current has been so far reduced that it is desirable to transfer the connections from series to parallel or series-parallel. As represented on Fig. 2, any one of the three types of relays whose characteristics have been shown would effect transfer at the point X on the curve AB. If, however, the final throttle opening has been less so that the curve CD represented the highest engine speed attained, a relay of the type having a characteristic VX would not have effected a transfer of connections and the motors would continue to run permanently in series and at low speed. Had the final throttle opening been even less so that the curve EF was the highest curve reached, neither a relay having the characteristic VX nor one having the characteristic WX would have effected a transfer. It will, therefore, be apparent that it is very desirable to have a relay having a characteristic YX or ZX.

Referring now to Fig. 3, I have shown in this figure how a relay may be constructed according to my invention to obtain an operating characteristic represented by the curve YX of Fig. 2. The relay 30 shown in Fig. 3 is of the differential type. It is provided with a walking beam 31 carrying solenoid cores 32 and 33 at opposite ends thereof. The core 33 is under the influence of a voltage responsive operating coil 34 while the core 32 is under the influence of a current responsive restraining coil 35. A light tension spring 36 is arranged to bias the beam 32 to its non-operated position, in which motor connections are established for series operation of the driving motors as will be more fully described hereinafter with reference to Fig. 1.

In Fig. 4, I have shown a modified form of a relay according to my invention. The relay 30A of this figure is provided with a walking beam 40 carrying solenoid cores 41 and 42 at the opposite ends thereof. The core 42 is provided with a voltage responsive operating coil 43 while the core 41 is provided with a current responsive restraining coil 44. A light tension spring 45 is arranged to bias the relay 30A into its operated position in which circuit connections are established for series-parallel connections of the driving motors as will be more fully described hereinafter. Since the relay 30A must be in its non-operated position at the beginning of the accelerating cycle, an additional separately excited restraining coil 46 is provided for initially and temporarily overcoming the biasing force of the spring 45. The coil 46 may be energized from a battery 47 through a time delay switch 48. The time delay switch 48 preferably is adjusted to disable the restraining coil 46 as soon as sufficient motor current is built up in the coil 44 to maintain the relay 30A in its nonoperated position. A relay constructed according to the arrangement of Fig. 4 will have an operating characteristic such as represented by the curve ZX in Fig. 2.

Referring back now to Fig. 1, I have shown a control system for a Diesel-electric vehicle embodying my invention in the form shown in Fig. 3. As shown in Fig. 1 the voltage-responsive operating coil 34 of the relay 30 is connected across the terminals of the variable voltage generator 11 in series with a plurality of calibrating resistances 50, 51 while the current restraining coil 35 of the relay 30 is connected in shunt to the commutating field 23 of the generator 11 and the differential exciting field 26 of the exciter 12. The coil 35 of the relay 30 is not shown directly in series circuit with the generator 11, but it will be understood that the current through the coil 35 is directly proportional to the current passing through the generator. The connection of the coil 35 in shunt with the fields 23 and 26 has the effect of reducing the current carried by the coil 35 while maintaining it proportional to generator current. It will, of course, be apparent to those skilled in the art that, if desired, the coil 35 may be connected directly in series with the field windings 23 and 26.

For a more complete understanding of the operation of a system embodying my invention it will be desirable to follow the operating sequence of the system shown in Fig. 1 through a complete accelerating cycle. To begin operation, the manually operated battery disconnect switches 52 and 53 must be closed. Power may then be applied to the control wires by closing the manually operated control switch 53a. To apply power to the master controller 54 the automatic throttle switch 56 must also be closed. As shown the throttle switch 56 is open only in the idling position of the prime mover throttle 56a. With the battery disconnect switches 52 and 53 and the control switch 53a closed, the prime mover may be started by completing a circuit through the manually operated engine starting switch 57. The switch 57 is biased to open position, but, when closed, completes an energizing circuit for the operating coil 58 of the generator starting switch GS. This circuit may be traced from the wire B+, connected to the positive side of the battery 60, through the control switch 53a, the engine starting switch 57, a contact segment 61 of the master controller 54, the contacts 62 of the exciter field contactor EF and the coil 58 to ground. As long as the engine starting button 57 is maintained depressed the generator starting switch maintains its contacts 63 and 64 closed to connect the starting field 23a and the battery 60 for driving the generator 11 as a motor to start the prime mover 10. As soon as the button 57 is released the energizing circuit for the coil 58 of the switch GS is broken at the switch 57 and the switch GS drops out to open its contacts 63 and 64. The prime mover 10 is now idling and driving the generator 11 and the exciter 12. With the engine 10 idling the generator 11 is generating substantially no voltage due to the fact that the contacts 65 of the exciter field contactor EF are open. The shunt field 24 of the exciter is therefore deenergized so that the exciter supplies substantially no current to the shunt field 22 of the generator 11.

If it is now desired to set the vehicle in motion, a desired direction of operation, for example "forward," must first be selected by manual operation of the reversing controller 66. The controller 66 has only two positions and is interlocked with the controller 54 so that it can be moved only when the controller 54 is in neutral. The master controller 54 may now be moved to its "reduced field" position in the same direction as that chosen by operation of the reversing controller 66, for example, "forward." Acceleration may now be begun by gradually advancing the engine throttle 56a from its idling position. Removal of the throttle 56a from its idling position results in the closing of the throttle switch 56. Through the switch 56 power is applied from the wire B+ to the contact 67 of the master controller 54. With the master controller 54 in its "reduced field" position the contact 68 is energized from the contact 67 through the contact segments 69 and 70 of the controller. Through the contact 68 of the master controller 54 an energizing circuit is established for a coil 71 of a reversing switch 72. The energizing circuit for the coil 71 of the reversing switch 72 may be traced from the wire B+ through the control switch 53a, the throttle switch 56, the contacts 67 and 68 and the contact segments 69 and 70 of the controller 54, and the coil 71 to ground. The coil 71 is arranged to throw the reversing switch 72 into the proper position for operation of the motors 14, 15, 16 and 17 in their forward direction. Had the master controller 54 been thrown to its series position in the reverse direction the contact 75 would have been energized from the contact 67 of the controller 54. Consequently, the coil 76 of the reversing switch 72 would have been energized in place of the coil 71. The coil 76 is arranged to throw the reversing switch 72 into the proper position for operation of the motors 14, 15, 16 and 17 in their reverse direction. When the reversing controller 66 is in its forward position an energizing circuit will be established for the operating coil 78 of the series contactor S. This circuit may be traced from the contact 67 of the master controller 54 through the contact segments 69 and 70, the contact 68, the contact segment 79 of the reverse controller 66, the contact 80 of the series-parallel contactor SP1, and the coil 78 to ground. The contactor S now picks up and closes its switch 77 to connect the motors 14, 15, 16 and 17 in series. In any operating position of the master controller 54 an energizing circuit is also established for the operating coil 81 of the exciter field contactor EF. This circuit may be traced from the contact 67 of the master controller 54 through the contact segment 79 of the reverse controller 66 in the same manner as the circuit for the operating coil 78 of the series contactor S, and from the segment 79 of the coil 81 of the exciter field contactor EF in parallel with the coil 78 of the series contactor S. The operation of the exciter field contactor EF closes its contacts 65 to apply energization to the separately excited field 24 of the exciter 12. Closure of the series contactor S results in the closing of its contacts 82 to establish an energizing circuit for the operating coil 83 of the generator field contactor GF. The operating circuit for the coil 83 may be followed from the wire B+ through the contacts 67 and 68 of the master controller 54, the contact segment 79 of the reversing controller 66 to the contacts 80 on the series-parallel contactor SP1 in the same manner as the energizing circuit for the coil 78 of the series contactor S, and from the contacts 80 through the contacts 82 of the series contactor S, the contacts 84 of the control relay CR, the contacts 85 of the generator starting switch GS and the operating coil 83 of the generator field contactor GF to ground. With the contacts 65 of the exciter field contactor EF and the contacts 87 of the generator field contactor GF closed, the generator 11 is operating under full field excitation of the shunt field 22. The motors 14, 15, 16 and 17 therefore accelerate in the series connection from a point such as K on the curve JK, along the various curves JK, GH, EF, CD and AB, toward a point such as X on the curve AB.

Assuming that the curve AB represents the maximum opening, the generator current and voltage will eventually reach the point X on that curve as the motors accelerate. At this point the values of voltage and current acting upon the differential relay 30 will be such as to permit operation of this relay. When the relay 30 operates it closes its contacts 90 to complete an energizing circuit for the operating coil 91 of the control relay CR. This energizing circuit may be traced from the wire B+ through the control switch 55, the throttle switch 56, the contacts 67 and 92 and the contact segments 69 and 93 of the master controller 54 to the wire BB+, and from the wire BB+ through the contacts 90 of the relay 30 and the operating coil 91 of the control relay CR to ground. When the control relay CR operates it locks itself in through its contacts 94 in shunt to the contacts 90 of the relay 30. As a result of the operation of the control relay CR the generator field contactor GF drops out due to the breaking of the energizing circuit for its operating coil 83 at the contacts 84 of the control relay CR. When the generator field contactor GF drops out it opens its contacts 95 to insert the calibrating resistance 51 in series with the energizing circuit of the voltage responsive coil 34 of the relay 30. The insertion of the resistance 51 in the circuit of the coil 34 assures the dropping out of the transfer relay 30. When the relay 30 drops out it causes no change in the circuit connections because the control relay CR is locked in through its contacts 94. It will also be observed that by the opening of the contacts 87 of the generator field contactor GF a resistance 96 is inserted in series with the separately excited shunt field of the generator 11. This results in the reduction of the excitation of the generator 11 and has for its purpose the smooth transfer from the series to the series-parallel connection of the motors 14, 15, 16 and 17. With the contactor GF dropped out an energizing circuit is established for the operating coil 97 of the series-parallel contactor SP1. The circuit for the coil 97 may be traced from the wire BB+ through the contacts 90 of the transfer relay 30, the contacts 98 of the generator field contactor GF and the coil 97 to ground. Energization of the coil 97 causes the series-parallel contactor SP1 to pick up and close its contacts 99 to complete a holding circuit for itself from the wire BB+ through its contacts 99 and the contacts 94 of the control relay CR. Upon picking up of the series-parallel contactor SP1 the contacts 80 of this contactor are opened to disable the energizing circuit for the operating coil 78 of the series contactor S. The closing of the contact 99 by operation of the series-parallel contactor SP1 completes an energizing circuit for the operating coil 100 of the series-parallel contactor SP2. This energizing circuit may be followed from the wire BB+ through the contact 94 of the control relay CR, the contact 99 of the series-parallel contactor SP1, the contact 101 of the series contactor S and the coil 100 to ground. The series-parallel contactors SP1 and SP2 have now picked up and closed their respective switches 101a and 101b to connect the motors 14 and 15 in parallel with the motors 16 and 17, while the series contactor S has dropped out to break the series connection of the motors at its switch 77. When the series-parallel contactor SP2 picks up it also completes a circuit for the operating coil 83 of the generator field contactor GF. This energizing circuit may be traced from the wire BB+ through the contacts 94 of the control relay CR, the contacts 99 of the series-parallel contactor SP1, the contacts 101 of the series contactor S, the contacts 102 of the series-parallel contactor SP2, the contacts 85 of the generator starting switch GS and the coil 83 to ground. The operation of the generator field contactor GF results in the closing of its contacts 95 to short circuit the calibrating resistance 50 in series with the operating coil 34 of the transfer relay 30. The operating coil 34 is therefore again connected for normal energization across the terminals of the generator 11.

Let it now be assumed that maximum throttle opening has not been changed so that the generator 11 is still operating on the curve AB on Fig. 2. However, with the motors 14 and 15 in parallel with the motors 16 and 17 the generator current will be twice its value before transfer, and, therefore, the motors are again operating at some point in the region of point B on the curve AB. The motors will now accelerate along the curve AB toward the point X. If the load on the motors is sufficiently light the point X will again be reached. At this point the transfer relay 30 will again pick up to close its contacts 105 and shunt the field windings of the motors. Since the master controller 54 is already in its "reduced field" position, the contact 106 will be energized from the contact segment 107. Through the contact 106 of the controller an energizing circuit is completed for the operating coils 108 and 109 of the field shunting contactors M1 and M2 respectively. This energizing circuit may be traced from the contact segment 107 through the contact 106 to the wire 106a, and from the wire 106a through the contacts 105 of the transfer relay 30, the contacts 109a of the series-parallel contactor SP2 and in parallel through the coils 108 and 109 to ground. When the field shunting contactors M1 and M2 pick up they close their respective contacts 110 and 111 to complete shunt circuits for the fields 18, 19 and 20, 21 respectively of the motors 14, 15, and 16, 17 respectively. When the contactor M2 picks up it also opens its contacts 112 to insert the calibrating resistance 50 in series with the operating coil 34 of the transfer relay 30. The resistance 50 is inserted for the purpose of regulating the drop out characteristic of the transfer relay 30 as represented by the curve $Y_1X_1$. With the motor fields shunted the motors again draw more current so that operation of the generator drops down along the curve AB from the point X toward the point $X_1$. The generator current however does not ordinarily increase beyond the point $X_1$, since $X_1$ is selected so that it will be slightly below the point where the generator will operate after field shunting.

Under reduced field conditions the speed of the driving motors 14, 15, 16, 17 remains under the control of the transfer relay 30 due to the fact that the relay 30 has a contact 105 in series with the energizing circuit of the operating coils 108 and 109 of the field shunting contactors M1 and M2. In the event that the vehicle slows down for any reason as, for example, the encountering of an increased grade, the motors 14, 15, 16 and 17 will draw more current and the point of generator operation will descend along the curve AB perhaps as far as the point $X_1$. At this point the transfer relay 30 will drop out and disable the energizing circuits of the shunting contactors M1 and M2. The contactors M1 and M2 will therefore drop out and open their respective contacts 110 and 111 to restore full field excitation to the motors 14, 15, 16 and 17. It will be understood, of course, that the points X and $X_1$ of the curve AB are separated sufficiently so that pumping between full field and reduced field cannot take place under any condition of operation.

Under some conditions of operation the vehicle may encounter such a heavy load that it will slow down to the point where it is desirable to transfer from series-parallel back to series. The system described above is not provided with automatic means to carry out such operation, and, for this reason I have provided an indicating light 115 arranged to give an indication to the operator when the generator current becomes undesirably large. To this end I provide a relay 116 having contact 117, connected to complete an energizing circuit for the lamp 115, and an operating coil 118 connected in series with the main line conductor 119 from the generator 11.

The above description of the sequence of operation has been based upon the assumption that the master controller 54 is thrown directly to its "reduced field" position and that the throttle 56a is then gradually advanced. It will be understood that acceleration may also be carried out by placing the master controller in its "series-parallel" position and then gradually advancing the throttle. In such a procedure the sequence of operation would be the same as that described except that the field shunting steps would be omitted due to discontinuity of the field shunting control circuit at the contact 106 of the master controller 54. Likewise, if the master controller is at first advanced only to its "series" position and the throttle then advanced, the sequence of operation will be the same up to the point where the relay CR operates upon closure of the contacts 90 of the transfer relay 30. In such a case the relay CR could not operate because of discontinuity of its energizing circuit at the contact 92 of the master controller 54. Furthermore, it will be apparent to those skilled in the art that acceleration may be carried out by setting the engine throttle at any predetermined point and then gradually advancing the master controller 54 through its various positions.

Referring now to Fig. 3, taken in connection with Fig. 2, it will be readily apparent in view of the above description that I have provided means to accomplish a transfer of connections from series to series-parallel at reduced engine speeds corresponding to partial throttle by using a differential transfer relay having the characteristics of an impedance relay. Such a relay when unbiased has a straight line characteristic passing through zero. Referring to Fig. 2 the portion $Z_1X$ of the curve YX is substantially a straight line directed toward zero. Since it is desirable to require some small voltage at the generator before the relay will operate, the light biasing spring 36 of Fig. 3 is used to bias the relay toward its non-operated position. This biasing force causes the characteristic YX of Fig. 2 to leave the straight line at 2, and across the voltage axis at Y.

Referring now to Fig. 4, it will be recalled that the light biasing spring 45 tends to hold the relay in its operated position rather than in its non-operated position as in Fig. 3. This means that a certain amount of restraining current is necessary to hold the relay in its non-operated position. Referring now to Fig. 2, this condition may be represented by curve ZX. The curve ZX follows the curve $Z_1X$ for the greater portion of its length between $Z_1$ and X. The light biasing spring 45, however, causes the curve ZX to branch off at $Z_1$ toward Z, in a manner similar to that in which the curve YX branches off at $Z_1$ toward Y. In order to render a relay such as that illustrated in Fig. 4 practical it is necessary to provide some temporary restraining means for holding the relay in its non-operated position until sufficient generator current is built up to enable the current restraining coil 44 to hold the relay in this position. Such a temporary restraining means is diagrammatically illustrated by a restraining coil 46 energized by a battery 47 through a time delay switch mechanism 48. If such an arrangement is utilized it will be found desirable to provide means for adjusting the length of the time delay in accordance with the speed at which the vehicle is travelling when the accelerating sequence is begun. As may be seen by referring to Fig. 2, if the vehicle is at standstill when the motors are first thrown on the line acceleration begins near the point B on the curve AB. However, if when the motors are first thrown on the line the vehicle is already travelling at some given speed, the accelerating sequence begins farther up the curve AB in the direction of the point X. It is therefore unnecessary to provide the same amount of time delay in the device 48 before the current restraining coil 44 is allowed to take control of the relay 40.

It will now be apparent that by making use of a differential transfer relay having impedance characteristics I am able to provide means for enabling a self-propelled electric vehicle to accelerate rapidly at light load. Formerly with such systems, when series-parallel accelerating connections were used for starting the driving electric motors, it was impossible to effect transition of connections at reduced engine speeds corresponding to partial throttle. By the use of my invention the operation of a self-propelled vehicle at light loads, as for example, in normal light switching operations, is greatly facilitated.

While in accordance with the provisions of the patent statutes I have described certain particular embodiments of my invention, I do not wish to be limited thereto, but I aim in the following claims to secure patent protection on all the various modifications which come within the spirit and scope of my invention.

What I claim as new and desire to secure by Letters Patent of the United States is:

1. A power system including a constant speed prime mover, a generator driven by said prime mover, a plurality of electric motors, switching means for controlling the interconnection of the generator and the motors for operation of the motors in a plurality of circuit relations, and means differentially responsive to generator voltage and current for controlling said switching means.

2. In a power system including a prime mover, a generator driven by the prime mover, and a plurality of motors, the combination of switching means for controlling the interconnection of the generator and the motors for operation of the motors in series or parallel arrangement, and a device for controlling said switching means having operating means responsive to the voltage of said generator and restraining means responsive to the value of the current passing through said generator.

3. A power system including a generator, a plurality of electric motors having series field windings, switching means for controlling the interconnection of said motors and said generator for operation of said motors in a plurality of circuit relations, shunting means for said series field windings, and a relay arranged sequentially to control said switching means and said shunting means, said relay comprising an operating coil responsive to the voltage of said generator and a restraining coil responsive to the current passing through said generator.

4. A power system including a generator, a plurality of motors, switching means for controlling the interconnection of the generator with the motors for operation of the motors in a plurality of circuit relations, and a relay differentially responsive to the voltage and to the current of said generator for controlling said switching means.

5. A power system comprising a prime mover of the type having a substantially constant speed for any predetermined throttle setting, a generator and an exciter driven by said prime mover, a differential field exciting winding for said exciter energized by the current passing through said generator, a plurality of electric motors, switching mechanism for controlling the interconnection of said motor and said generator for operation of said motors in a plurality of circuit relations, and a relay differentially responsive to the voltage and to the current of said generator for controlling said switching mechanism.

6. A power system comprising a prime mover of the type having a substantially constant speed for any predetermined throttle setting, a generator and an exciter driven by said prime mover, a field exciting winding for said exciter, means for energizing said field exciting winding in proportion to the value of the current flowing through said generator, a plurality of electric motors, switching mechanism for controlling the interconnection of said generator with said motors for operation of said motors in a plurality of circuit relations, and a device for controlling said switching mechanism having operating means responsive to the voltage of said generator and restraining means responsive to the current of said generator.

7. A power system comprising a prime mover of the type having a substantially constant speed for any predetermined throttle setting, a generator driven by said prime mover, a plurality of electric motors, switching mechanism for controlling the interconnection of said motors with said generator for operation of said motors in a plurality of circuit relations, and a device movable to control said switching mechanism having an operating coil responsive to the voltage of said generator and a restraining coil responsive to the current of said generator.

8. An electrically driven vehicle comprising a prime mover, a generator driven by said prime mover, an electric motor having a series field connected in circuit with said generator, means for partially disabling said series field, and means differentially responsive to generator voltage and current for controlling said disabling means.

9. An electrically driven vehicle comprising a prime mover, a generator driven by said prime mover, an electric motor having a series field connected in circuit with said generator, means for partially disabling said series field, and a device for controlling said disabling means having operating means responsive to the voltage of said generator and restraining means responsive to the current of said generator.

10. A power system comprising a generator, a plurality of electric motors having series fields, switching means for controlling the interconnection of said generator and said motors for operation of said motors in a plurality of circuit relations, means for partially disabling said field circuits, and means differentially responsive to generator voltage and current for controlling said switching means and said disabling means.

11. A power system comprising a generator, a plurality of electric motors having series fields, switching means for controlling the interconnection of said generator and said motors for operation of said motors in a plurality of circuit relations, means for partially disabling said series fields, and a device for controlling said switching means and said disabling means having operating means responsive to the voltage of said generator and restraining means responsive to the current of said generator.

12. In a power system including an electric generator, a plurality of electric motors and switching means for controlling the interconnection of generator with said motors for operation of the motors in a plurality of circuit relations, a transfer device for controlling said switching means comprising an operating coil responsive to the voltage of said generator, a restraining coil responsive to the current passing through said generator, and biasing means for assisting said restraining coil.

13. In a power system including an electric generator, a plurality of electric motors and switching means for controlling the interconnection of said generator with said motors for operation of said motors in a plurality of circuit relations, a transfer device for controlling said switching means comprising an operating coil responsive to the voltage of said generator, a restraining coil responsive to the current passing through said generator, and biasing means opposing said restraining coil.

14. In a power system including an electric generator, a plurality of electric motors and switching means for controlling the interconnection of said generator with said motors for operation of said motors in a plurality of circuit relations, a transfer device for controlling said switching means comprising an operating coil responsive to the voltage of said generator, a restraining coil responsive to the current passing through said generator, biasing means opposing said restraining coil, a separately excited restraining coil adapted temporarily to overcome said biasing means, and means for controlling the period of energization of said separately excited restraining coil in accordance with the initial current passing through said restraining coil.

15. A power system including a prime mover, a generator driven by the prime mover, a plurality of electric motors, switching means for controlling the interconnection of the generator and the motors for operation of the motors in a plurality of circuit relations, and means differentially responsive to generator voltage and current for controlling said switching means.

16. A power system comprising a prime mover and a generator and an exciter driven by said prime mover, a differential field exciting winding for said exciter energized by the current passing through said generator, a plurality of electric motors, switching mechanism for controlling the interconnection of said motors and said generator for operation of said motors in a plurality of circuit relations, and a relay differentially responsive to the voltage and to the current of said generator for controlling said switching mechanism.

17. A power system comprising a prime mover and a generator and an exciter driven by said prime mover, a field exciting winding for said exciter, means for energizing said field exciting winding in proportion to the value of the current flowing through said generator, a plurality of electric motors, switching mechanism for controlling the interconnection of said generator with said motors for operation of said motors in a plurality of circuit relations, and a device for controlling said switching mechanism having operating means responsive to the voltage of said generator and restraining means responsive to the current of said generator.

18. A power system comprising a prime mover, a generator driven by said prime mover, a plurality of electric motors, switching mechanism for controlling the interconnection of said motors with said generator for operation of said motors in a plurality of circuit relations, and a device movable to control said switching mechanism having an operating coil responsive to the voltage of said generator and a restraining coil responsive to the current of said generator.

JACOB W. McNAIRY.